April 25, 1967

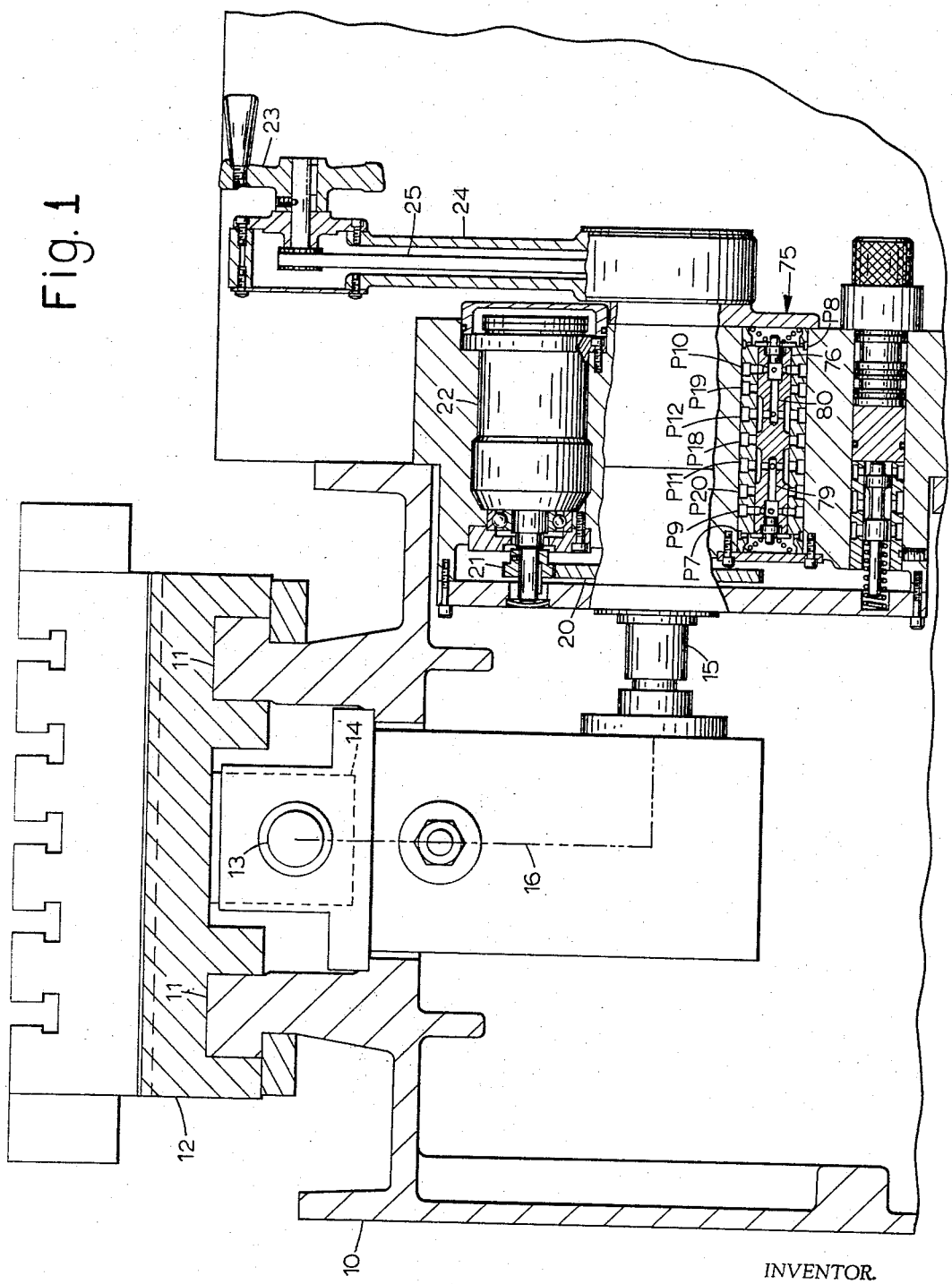

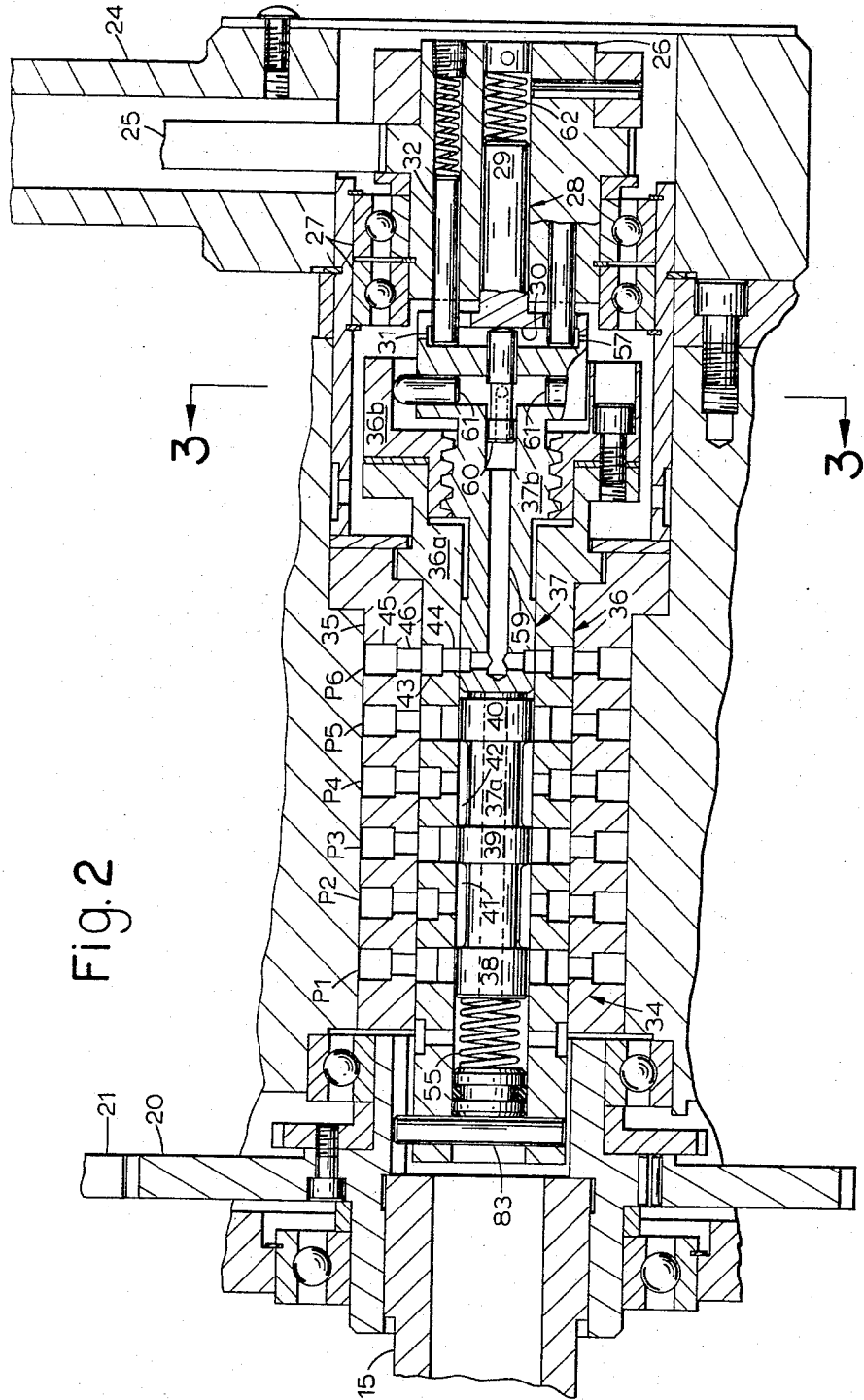

L. A. DEVER 3,315,569

CONTROL MECHANISM FOR MACHINE TOOL

Filed June 24, 1965

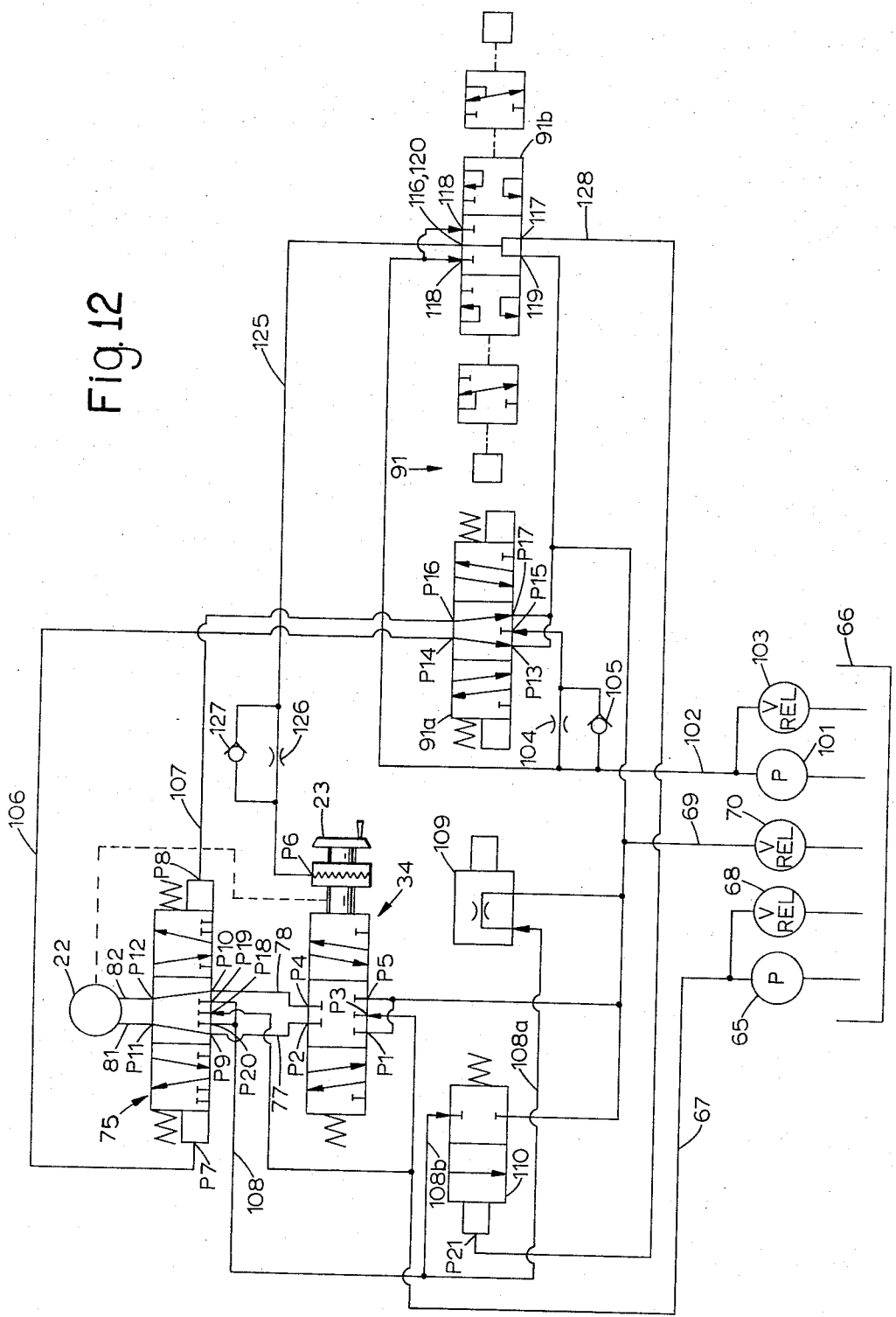

United States Patent Office 3,315,569
Patented Apr. 25, 1967

3,315,569
CONTROL MECHANISM FOR MACHINE TOOL
Lewis A. Dever, Cincinnati, Ohio, assignor to The Cincinnati Milling Machine Co., Cincinnati, Ohio, a corporation of Ohio
Filed June 24, 1965, Ser. No. 466,540
8 Claims. (Cl. 91—378)

The present invention relates to mechanism in a machine tool for effecting controlled movement of a movable member, such as a table.

In the present invention, a servomechanism is provided to control the movement of a machine tool slide, or table, in response to an input. In the preferred form of the invention, the servomechanism includes a servo valve which has a valve plunger unit threadedly engaged with a ported valve sleeve unit. A rotary motion, as by a handwheel, defines an input to one of the valve units which, by effecting a relative axial movement between the valve plunger unit and the valve sleeve unit from a null relationship, runs a hydraulic motor to move the table or slide. The other valve unit is rotated by feedback movement from the table to reestablish null relationship between the servo valve units, stopping the table after a movement proportional to the input movement. The threaded relationship between the valve plunger unit and the valve sleeve unit, and the rotary input and rotary feedback, produces accurate, sensitive servomechanism control because of the extended rotary movement required of both of the valve units to produce a small axial movement therebetween.

In the preferred embodiment of the invention, other means are provided to move the slide or table, in addition to, and independently of, the servo controlled movement thereof. In the particular embodiment of the invention illustrated, power feed movement and power rapid traverse movement of the table or slide can be effected. These power movements are produced by the same motor which produces the servo controlled movement. The sleeve unit and plunger unit of the servo valve, which are both rotatable, are automatically locked together in null relationship during power feed movement and power rapid traverse movement of the table, and are automatically unlocked when the power feed or power traverse movement of the table terminates. Thus, when the power feed or power traverse movement of the table ends, the servo valve units are in null relationship, ready for servo movement in response to an input, as from a handwheel, regardless of the position of the table.

It is therefore one object of the present invention to provide an improved servomechanism control for a machine tool slide or table. It is another object of the present invention to provide an improved machine tool servo valve which responds to a rotary input movement and to a rotary feedback movement substantially greater than the linear movement between the valve units of the valve. It is yet another object of the present invention to produce an improved servo valve in which the valve plunger unit and valve sleeve unit are in threaded engagement. It is still another object of the present invention to provide an improved servomechanism with a servo valve having a valve plunger unit and valve sleeve unit which can be locked together in null relationship. It is yet another object of the present invention to provide, in a machine tool, a member which can be moved by servomechanism control, and by some other control means independent of the servomechanism, in which the servomechanism control is rendered ineffective during the movement by the other control means. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a fragmentary view of a machine tool constructed in accordance with the present invention;

FIG. 2 is an enlarged view of the servo valve of the present invention;

Figure 5:
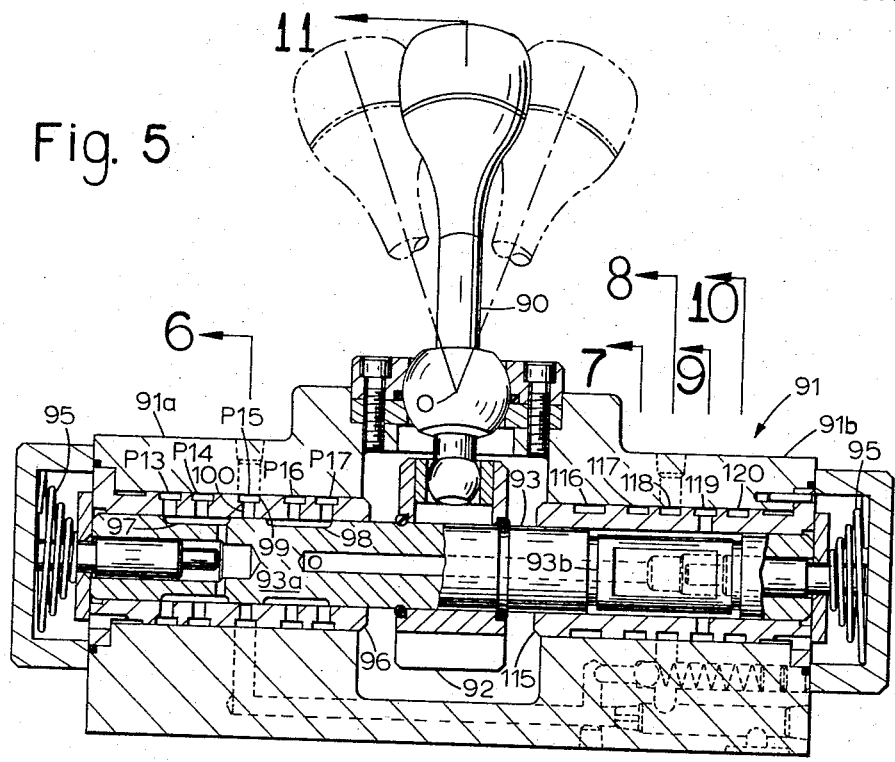
FIG. 5 is a view taken on the line 5—5 of FIG. 4.
Figure 4:
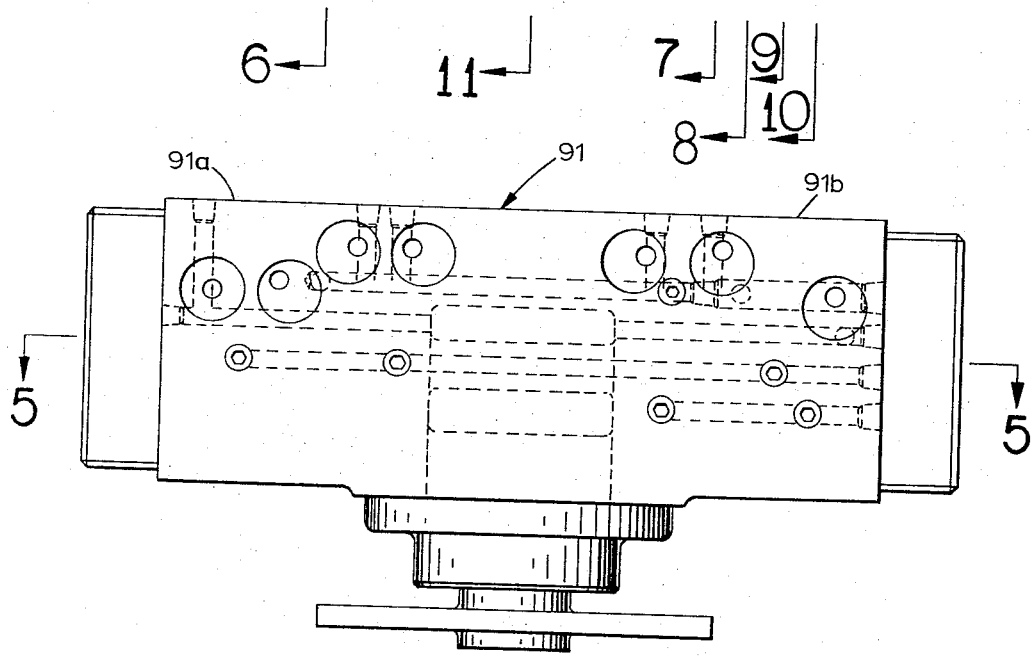
FIG. 4 is a view of the power feed and power rapid traverse valve.

FIGS. 6, 7, 8, 9, 10, and 11 are views taken on the lines 6—6, 7—7, 8—8, 9—9, 10—10, and 11—11 of FIG. 5; and FIG. 12 is a schematic diagram of the part of the hydraulic circuit of the machine of FIG. 1.

There is shown in FIG. 1 a portion of the bed 10 of a milling machine. The bed has ways 11 on which is mounted the slide, or table, 12 for longitudinal movement towards and away from the viewer in FIG. 1. A screw 13 is journaled in the bed and is threadedly engaged with a nut 14 connected to the table so that rotation of the screw, in one direction or the other, will move the slide 12 along the ways 11 in one direction or the other. The screw 13 is mechanically connected to a drive shaft 15, as indicated by dotted line 16, in a manner to transmit rotary movement of drive shaft 15 to rotary movement of screw 13.

As shown best in FIG. 2, the drive shaft 15 is in splined engagement with a gear 20 which meshes with a gear 21 (FIG. 1) mounted on the drive shaft of a hydraulic motor 22. Thus rotation of motor 22 rotates shaft 15 through gears 21, 20 which rotates screw 13 to move the table 12. The table 12 can be moved by motor 22 a selected distance at a selected rate under control of a servo system, or can be moved by motor 22 at a predetermined rate for power feed, or can be moved by motor 22 at a faster predetermined rapid traverse rate.

The movement of the table 12 by motor 22 a selected distance at a selected rate is effected by a handwheel 23 which defines the input to the servo system. The handwheel 23 is rotatably mounted in an upstanding housing 24 connected to the bed 10. A band 25 connects the handwheel 23 to a stub shaft 26 which is carried by bearings 27 mounted in the bed. A clutch memebr, indicated generally at 28, has a shank 29 slidably received in a bore in shaft 26 and has a face 30 with a ring of teeth 31 thereon. Pins 32, extending from shaft 26, pass through openings in face 30 and serve to transmit rotation from shaft 26 to clutch member 28.

A bushing 35 is securely received in the bed 10. A servo valve, indicated generally at 34, has a sleeve unit 36 which consists of a ported annular member 36a and an internally threaded rim member 36b connected to member 36a. The sleeve unit 36 is rotatably received in bushing 35 but is held against axial movement relative to the bushing 35. A valve plunger unit 37 consists of a spool member 37a and an externally threaded clutch member 37b. The members 37a and 37b are not connected but are in continuous end to end contact and move axially in unison. The valve plunger unit 37 is slidably received in sleeve 36 and the spool member 37a thereof has spaced spools 38, 39, and 40 thereon defining annular passages 41, 42 therebetween. The annular member 36a of sleeve unit 36 has external annular grooves 43 and radial passages 44 extending inwardly therefrom. The bushing 35 has external annular grooves 45 with radial passages 46 extending inwardly therefrom. The axially spaced openings through the bushings and sleeve unit define ports identified as P1, P2, P3, P4, P5, and P6. When the valve plunger unit 37 is in a null position with respect to the sleeve unit 36, as shown in FIG. 2, ports P1, P3, and P5 are blocked by spools 38, 39, and 40, respectively, and ports P2, P4 are each isolated from all other ports.

The valve plunger unit 37 is received in sleeve unit 36 between spring 55 and clutch member 28. Clutch member 37b, which has clutch teeth 57 at one end for engagement with the teeth 31 of clutch member 28, is threadedly received in rim member 36b of sleeve unit 36. Clutch member 37b has an internal passage 59 with an axial portion in which a plunger 60 is received and with two radial branches in which pins 61 are received. The passage 59 is in continuous communication with port P6. The plunger 60 has an internal passage which transmits pressure from port P6, when pressure is present at that port, not only to plunger 60 but to pins 61. The plunger 60 extends out of clutch member 37b for contact with clutch member 28. When there is no pressure at port P6, clutch member 28 is urged by spring 62 into engagement with clutch member 37b but, when pressure is present at port P6, plunger 60 urges clutch member 28 out of engagement with clutch member 37b.

As shown in FIG. 12, a pump 65 takes fluid from a sump 66 and delivers it under pressure to a pressure line 67. A relief valve 68, connected to line 67 and discharging to the sump, limits the pressure in line 67 to a predetermined maximum (say 500 pounds per square inch). Pressure line 67 is connected to port P3, and a return line 69 leading to the sump is connected to ports P1 and P5. Return line 69 has a relief valve 70 therein which dumps fluid to the sump at a low pressure (say 15 pounds per square inch) and which maintains a slight back pressure in the return line.

Rotation of handwheel 23 by the machine operator, when there is no pressure at port P6 and clutch members 28 and 37b are engaged, effects rotation of clutch member 37b. By virtue of the threaded engagement between clutch member 37b and the rim member 36b, axial movement of the valve plunger unit 37 relative to sleeve unit 36 is effected since, at this time, sleeve unit 36 is held against rotation. Depending on the direction of rotation of handwheel 23, either port P3 is connected through passage 41 to port P2 and port P4 is connected through passage 42 to port P5, or port P3 is connected through passage 42 to port P4 and port P2 is connected through passage 41 to port P1. Thus, when valve member unit 37 moves axially, pressure is introduced to one of the ports P2 or P4, with the other of the ports P2 or P4 connected to the return line.

As shown best in FIGS. 1 and 12, a reversing valve 75 has a spring centered valve plunger 76 which is shifted to the right when pressure is introduced to end port P7 at the left end of the valve and which is shifted to the left when pressure is introduced to end port P8 at the right end of the valve. Port P9 and port P10 are connected, by lines 77 and 78, to ports P2 and P4. Port P9 and port P10 are also connected, when valve member 76 is centered as shown in FIG. 1 through passages 79, 80 in valve plunger 76, to ports P11 and P12, respectively, which are connected by lines 81, 82 to the sides, respectively, of hydraulic motor 22. Thus when pressure is introduced to port P2 or P4, that pressure is transmitted through valve 75, if valve member 76 thereof is centered, to run the motor 22 in one direction or the other.

When the motor runs, gear 21 rotates to rotate gear 20 and to rotate the shaft 15 which effects movement of the slide. The sleeve unit 36 is keyed to gear 20 by pin 83 so the sleeve unit 36 rotates as the slide 12 moves. Rotation of sleeve unit 36, because of the threaded engagement between sleeve unit 36 and plunger unit 37, effects axial movement of plunger unit 37 (and spool member 37a thereof) in the direction opposite the direction in which the plunger unit 37 (and spool member 37a thereof) was moved by the handwheel. In other words, the rotation of sleeve unit 36 with rotation of motor 22 and movement of slide 12 constitutes a mechanical feed back which returns the plunger unit 37 (and spool member 37a thereof) to a null position in relation to the sleeve unit 36 (and ported annular member 36a thereof). The motor 22 stops running to stop the slide 12 when the plunger unit 37 reaches the null position. Thus, the movement of the slide 12 is always proportional to the input (that is, the angular rotation of the handwheel 23). If the handwheel 23 is continuously rotated, the motor 22 will continue running, and the slide 12 will move, following the handwheel, at a rate proportional to the rate of rotation of the handwheel. Pins 84, mounted in rim member 36b and extending into segmental grooves 85 in clutch member 37b, prevent the handwheel (and plunger unit 37) from running too far ahead of the motor 22 (and sleeve unit 36).

Thus, the operator will use the handwheel 23 to effect selected positioning of slide 12, or to effect movement of slide 12 at a selected and/or varying rate. To move slide 12 at a predetermined constant feed rate, or at a faster predetermined constant rapid traverse rate, the operator will use control handle 90 of control valve 91. The handle 90 is received in valve 91 for pivotal movement about point O. The handle is engaged by means of link 92 with valve plunger 93 to pivot valve plunger 93 about point Q or to shift valve plunger 93 axially. Pivotal movement of handle 90 between a position in plane A as shown in solid lines in FIG. 11 and a position in plane B as shown in dotted lines in FIG. 11 rotates the valve plunger 93 between a feed position (as shown) and a rapid traverse position. Pivotal movement of control handle 90 to one or the other of the positions shown in dotted lines in FIG. 5 shifts the plunger axially in one direction or the other to effect feed movement of slide 12 (if the handle 90 is in the plane A) in one direction or the other or to effect rapid traverse movement of slide 12 (if the handle 90 is in the plane B) in one direction or the other. Spring 94 (FIG. 11) moves valve member 93 to, or holds valve member 93 in, the feed position and moves control handle 90 to, or holds control handle 90 in, plane A when the handle is released. Springs 95 (FIG. 5) move valve plunger 93 and control handle 90 to, or hold valve plunger 93 and control handle 90 in, a center position as shown in FIG. 5 when the handle is released.

The control valve 91 has a portion 91a (the left side as viewed in FIG. 5) which is a pilot valve for the reversing valve 75. The valve portion 91a has a valve sleeve 96 secured in the valve housing. The sleeve 96 slidably receives portion 93a of valve plunger 93 which has two annular passages 97, 98 thereon. The valve sleeve 96 has ports P13, P14, P15, P16, and P17 therein, each comprising an annular groove 99 and a radial passage 100. A pump 101 takes fluid from sump 66 and delivers it under pressure to pressure line 102. A relief valve 103 is connected to line 102 and discharges to sump 66. The relief valve 103 limits the pressure in line 102 to, say, 300 pounds per square inch. Pressure line 102 is connected through restriction 104 to port P15 which is blocked by valve member portion 93a when the control handle 90 is in the axial position shown in FIG. 5 (either in plane A or in plane B. A check valve 105 is connected around restriction 104. Port P13, which is blocked when valve member 93 is shifted to the extreme right from the position shown in FIG. 5, and port P17, which is blocked when valve member 93 is shifted to the extreme left from the position shown in FIG. 5, are both connected to return line 69. Port P14, which is connected to pressure port P15 when valve member 93 is shifted to the extreme right, is connected by line 106 to port P7 at the left end of the reversing valve 75. Pressure transmitted through control valve portion 91a to the port P7 at left end of the valve 75 shifts the valve plunger 76 to the right (as viewed in FIG. 1), connecting port P18, which is connected to pressure line 67, to port P11, which is connected by line 81 to one side of motor 22. At the same time port P12, which is connected by line 82 to the other side of the motor, is connected to port P19 which is connected to return line 108. Thus, motor 22 is run in one direction to move the slide in one direction when the reversing valve plunger 76 is shifted to the right (as viewed in FIG. 1) in response to movement of valve plunger 93 of valve 91 to the right (as viewed in FIG. 5). Port P16 which is connected to pressure port 15 when valve member 93 is shifted to the extreme left, is connected by line 107 to port P8 at the right end of the reversing valve 75. Pressure transmitted through control valve portion 91a to the port P8 at the right end of the valve 75 shifts the valve plunger 76 to the left (as viewed in FIG. 1), connecting port P18 to port P12, which is connected to line 82. At the same time port P11 which is connected to line 81 is connected to port P20 which is connected to return line 108. Thus motor 22 is run in the opposite direction to move the slide in the opposite direction when the reversing valve plunger 76 is shifted to the left (as viewed in FIG. 1) in response to movement of valve plunger 93 of valve 91 to the left (as viewed in FIG. 5).

Return line 108 is connected to return line 69 by two paths, line 108a and line 108b. Line 108a contains a manually set throttle valve 109 which restricts the flow from motor 22. Line 108b contains a by-pass valve 110 which, when operated by the introduction of pressure at port P21, connects portions of line 108b around throttle valve 109 to permit a freer flow from motor 22. Thus, when there is no pressure at port P21, the slide moves at a predetermined constant feed rate (established by the setting of throttle valve 109), and when there is pressure at port P21, the slide moves at a faster constant rapid traverse rate.

Figure 6:
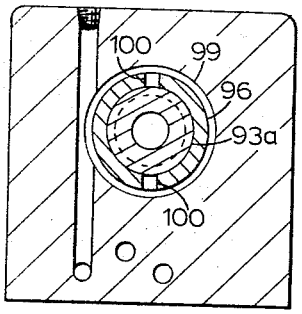
Figure 7:
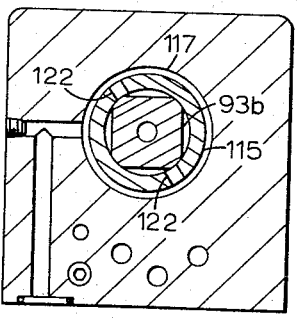
Figure 8:
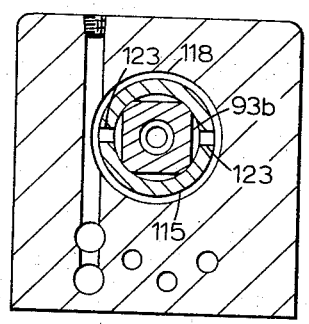
Figure 9:
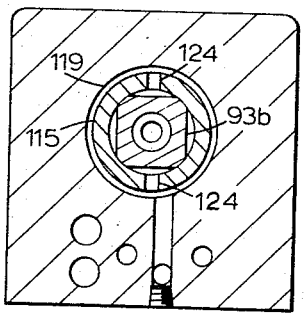
Figure 10:
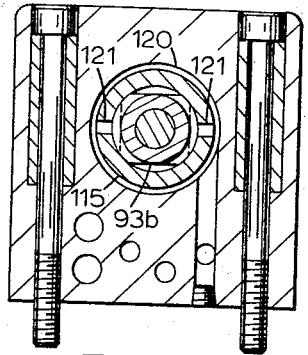

The right side 91b (as viewed in FIG. 5) of valve 91 has valve sleeve 115 with external annular grooves 116, 117, 118, 119, and 120. Grooves 116 and 120 communicate with radial passages 121 which are angularly positioned as shown in FIG. 10; annular groove 117 communicates with radial passages 122 angularly positioned as shown in FIG. 7; annular groove 118 communicates with radial passages 123 angularly positioned as shown in FIG. 8; and annular groove 119 communicates with radial passages 124 angularly positioned as shown in FIG. 9. The portion 93b of valve plunger 93 in valve portion 91b is square and, when control handle 90 is in plane A, the valve plunger portion 93b is angularly positioned as shown in FIGS. 7, 8, 9, and 10.

Figure 11:
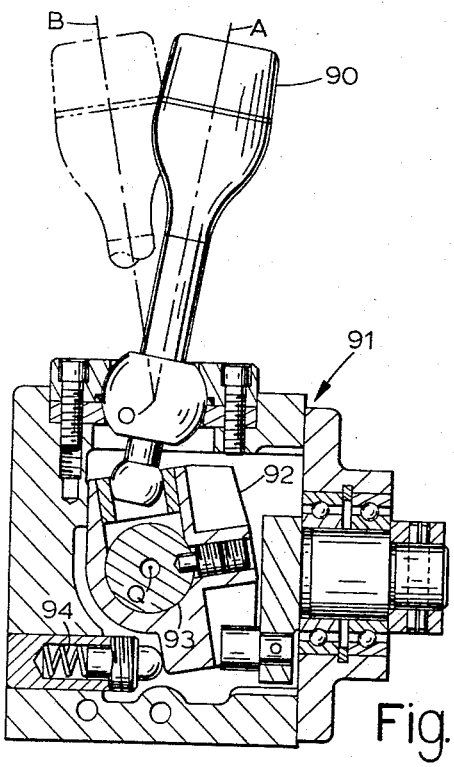
Figure 3:
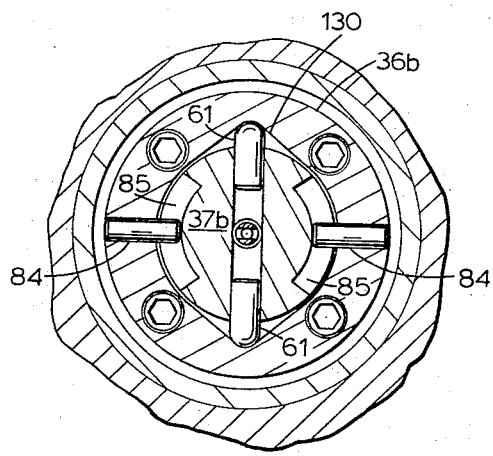
FIG. 3 is a view taken on the line 3—3 of FIG. 2.

Grooves 116 and 120 are both connected by a line 125, which cointains a restriction 126, to port P6 of valve 34. A check valve 127 is connected around restriction 126. A line 128 is connected between groove 117 and port P21. Groove 118 is connected to pressure line 102 and groove 119 is connected to return line 69. When the valve plunger is centered axially, as shown in FIG. 5, and in plane A, as shown in FIG. 11, grooves 117, 119, 116, and 120 are connected. Thus, lines 128 and 125 are connected to return line 69 and there is no significant pressure at port P21 or at port P6. When the control handle 90 is shifted to the left to shift valve plunger 93 to the right as viewed in FIG. 5 (with handle 90 held in plane A) grooves 117 and 119 remain connected, but grooves 116 and 120 become connected to groove 118 which is connected to pressure line 102. Thus line 128 remains connected to return line 69, and valve 110 remains unoperated, but pressure is introduced to line 125 and to port P6 in valve 34. When pressure is introduced to port P6, plunger 60 in valve 34 is extended to disengage clutch member 28 from clutch member 37b. At the same time plungers 61 are extended. It will be noted from FIG. 3 that rim member 36b of sleeve unit 36 has sloping grooves 130. When pins 61 are urged outwardly, the clutch member 37b of plunger unit 37, which is threadedly engaged with the rim member 36b of sleeve unit 36, will assume a locked predetermined angular position with respect to the sleeve unit 36. When the clutch member 37b is locked, the valve plunger unit 37 is in a null position (shown in FIG. 2) with respect to the ports of the valve.

When the control handle 90 is shifted to the right to shift valve plunger 93 to the left as viewed in FIG. 5 (with handle 90 held in plane A) grooves 117 and 119 remain connected but grooves 116 and 120 become connected to pressure groove 118. Thus, the same pressure conditions prevail in valve 91b when the handle is in plane A if the valve plunger is shifted off-center in either direction.

With the control valve plunger 93 in either extreme position, shifting the control handle from plane A to plane B will disconnect groove 117 from groove 119 and connect groove 117 instead to pressure groove 118. Thus line 128 and port P21 of valve 110 become connected to pressure. Presure at port P21 operates valve 110 to by-pass the throttle valve 109. Consequently, the return flow from motor 22 is relatively unrestricted, and the table moves in rapid trasverse.

When the control handle 90 is first shifted to the left or right, the pressure at port P6 will develop faster than pressure at ports P7 and P8 because of restriction 104. Consequently, the clutch members 28 and 37b will become disengaged, and the valve plunger 37 will be locked in the null position, before the reversing valve is shifted to the left or right to begin power feed or rapid traverse movement of the slide. Also, when the control handle 90 is first shifted to a center position, the pressure at ports P7 and P8 will drop faster than the pressure at port P6 because of restriction 126. Thus, clutch members 28 and 37b will engage, and the valve plunger unit 37 will be released, after the reversing valve returns to a centered position and the motor 22 and slide 12 have stopped.

It will be noted that whenever the slide 12 is under the control of control valve 91, the valve plunger 37 is locked in a null position with respect to the ports of the valve. As soon, however, as control valve handle 90 is returned to the normal position shown in the drawings, the valve plunger is unlocked and conditioned for servo control of the table in response to any input transmitted by the operator to handwheel 23.

What is claimed is:
1. In a machine tool having a movable member:
 (a) a hydraulic motor to move said machine tool member,
 (b) a hydraulic valve comprising a first valve unit and a second valve unit, said first and second valve units in threaded engagement, said valve hydraulically connected to the motor for operation of the motor in response to relative axial movement between the valve units,
 (c) means to rotate one of said valve units to effect relative axial movement between the valve units in one direction, and
 (d) means responsive to operation of the motor to rotate the other of said valve units to effect relative axial movement between the valve units in the opposite direction.

2. A hydraulic system to actuate a movable machine tool member comprising:
(a) a hydraulic motor to move said machine tool member,
(b) a hydraulic valve comprising a valve unit defining a valve sleeve and a valve unit defining a valve plunger received inside the sleeve, said valve units in threaded engagement for relative axial movement on relative rotation therebetween, said valve hydraulically connected to the motor for operation of the motor in response to relative axial movement between the valve units,
(c) means to rotate one of said valve units to effect relative axial movement between the valve units in one direction, and
(d) means responsive to operation of the motor to rotate the other of said valve units to effect relative axial movement between the valve units in the opposite direction.

3. In a machine tool:
(a) a slide member,
(b) a rotary hydraulic motor to move the slide,
(c) a hydraulic valve comprising a valve unit defining a ported valve sleeve and a valve unit defining a valve plunger received inside the sleeve, said valve units in threaded engagement for relative axial movement on relative rotation therebetween, said valve hydraulically connected to the motor for operation of the motor in response to relative axial movement between the valve units,
(d) a handwheel connected to one of said valve units for rotation of said valve unit to effect relative axial movement between the valve units in one direction, and
(e) means connecting the other valve unit to the rotary motor for rotation of the other of said valve units to effect relative axial movement between the valve units in the opposite direction.

4. In a machine tool having a movable member:
(a) a hydraulic motor to move said machine tool member,
(b) a hydraulic valve comprising a first rotatable valve unit and a second rotatable valve unit, said first and second valve units in threaded engagement, said valve hydraulically connected to the motor for operation of the motor in response to relative axial movement between the valve units from a null relationship therebetween,
(c) means to rotate one of said valve units to effect relative axial movement between the valve units in one direction from said null relationship,
(d) means connecting the other of said valve units to the motor for rotation of said other valve unit to effect relative axial movement between the valve units in the opposite direction from said null relationship, and
(e) means selectively to secure said valve units together.

5. In a machine tool having a movable member:
(a) a hydraulic valve comprising a first rotatable valve unit and a second rotatable valve unit, said first and second valve units in threaded engagement, said valve operable to move said movable member in response to relative axial movement between the valve units,
(b) means selectively to lock said units together to render said valve ineffective to move the movable member,
(c) means to rotate one of said valve units to effect relative axial movement between the valve units in one direction when the valve units are not locked together,
(d) means responsive to movement of the movable member to rotate the other of said valve units to effect relative axial movement between the valve units in the opposite direction when the valve units are not locked together, and
(e) means to move said movable member independently of said hydraulic valve when said valve units are locked together.

6. Mechanism for moving a machine tool member comprising:
(a) a hydraulic valve comprising a first rotatable valve unit and a second rotatable valve unit, said first and second valve units in threaded engagement for relative axial movement on relative rotation therebetween, said valve operable to move said machine tool member in response to relative axial movement between the valve units from a null relationship,
(b) means connecting the first valve unit for rotation in response to movement of said machine tool member,
(c) means selectively to rotate said second valve unit,
(d) means selectively to lock said first and second valve units together in null relationship, and
(e) means to move said machine tool member independently of said valve when said valve units are locked together in null relationship.

7. Mechanism for moving a machine tool member comprising:
(a) a hydraulic motor to move said machine tool member,
(b) a first hydraulic valve comprising a first rotatable valve unit defining a valve sleeve and a second rotatable valve unit defining a valve plunger, said valve units in threaded engagement for relative axial movement on relative rotation therebetween, said valve hydraulically connected to the motor for operation of the motor in response to relative axial movement between the valve units from a null relationship therebetween,
(c) means to rotate one of said valve units to effect relative axial movement between the valve units in one direction from said null relationship,
(d) means connecting the other of said valve units to the motor for rotation of said other valve unit to effect relative axial movement between the valve units in the opposite direction from said null relationship,
(e) a second hydraulic valve operable to run the motor independently of said first valve, and
(f) means responsive to operation of the motor with said second valve to lock the valve units of said first hydraulic valve together in null relationship.

8. Mechanism for moving a machine tool member comprising:
(a) a hydraulic motor to move said machine tool member,
(b) a first hydraulic valve comprising a first rotatable valve unit defining a valve sleeve and a second rotatable valve unit defining a valve plunger, said valve units in threaded engagement for relative axial movement on relative rotation therebetween, said valve hydraulically connected to the motor for operation of the motor in response to relative axial movement between the valve units from a null relationship therebetween,
(c) a handwheel to rotate one of said valve units when engaged therewith to effect relative axial movement between the valve units in one direction from said null relationship,
(d) means connecting the other of said valve units to the motor for rotation of said other valve unit to effect relative axial movement between the valve units in the opposite direction from said null relationship,
(e) a second hydraulic valve operable to run the motor independently of said first valve, and
(f) means responsive to operation of the motor with said second valve to lock the valve units of said first hydraulic valve together in null relationship and to disengage the handwheel from said one of said valve units thereof.

References Cited by the Examiner

UNITED STATES PATENTS

| | | | |
|---|---|---|---|
| 1,689,677 | 10/1928 | Martin | 91—380 |
| 2,930,358 | 3/1960 | Folkerts | 91—378 |
| 2,969,808 | 1/1961 | Horlacher | 137—625.23 |
| 2,980,067 | 4/1961 | Millard | 91—378 |
| 2,994,305 | 8/1961 | Bruet | 91—380 |
| 3,103,148 | 9/1963 | Brusque | 91—380 |
| 3,211,182 | 10/1965 | Gyurik | 137—625.6 |

MARTIN P. SCHWADRON, *Primary Examiner.*

B. L. ADAMS, *Assistant Examiner.*